Patented Oct. 3, 1950

2,524,658

UNITED STATES PATENT OFFICE 2,524,658

PROCESS FOR WORKING UP THE PANCREAS OF MAMMALS

Svend Emil Frederiksen, Charlottenlund, Denmark, assignor to Novo Terapeutisk Laboratorium A/S, Copenhagen, Denmark, a firm No Drawing. Application October 23, 1946, Serial No. 705,247. In Germany April 9, 1941

Section 1, Public Law 690, August 8, 1946
Patent expires April 9, 1961

4 Claims. (Cl. 195—62)

The pancreas of mammals, more especially of horned cattle or pigs, has been technically used for many years as a raw material, partly for the preparation of the pancreatic hormone for reducing the blood sugar commonly known as insulin, partly for the production of pancreatic enzyme preparations for use, for instance, in the tanning and textile industries as a constituent of the so-called enzymic washing agents or for pharmaceutical and other purposes, in which exogenously secreted enzymes of the pancreas, particularly trypsin, are used.

The treatment of the glands for the preparation of the pancreatic hormone consists essentially in treating the minced glands with a solvent for the hormone under such conditions that the hormone is protected against the action of the trypsin. In practice acidified alcohol is used almost exclusively as a solvent, the trypsin being thereby rendered inactive. By this mode of operation the trypsin is so extensively destroyed that the residue resulting from the extraction cannot be usefully employed as a raw material for the production of pancreatic enzyme preparations.

If, therefore, the glands were to be used as a raw material for the production of enzyme preparations it has been necessary hitherto to use them directly, that is to say without a preliminary treatment for the preparation of the pancreatic hormone, by extracting the enzymes from the usually fresh or preserved glands by treatment with suitable extracting agents, preferably aqueous liquids. The residue so obtained has not found application in the arts as a raw material and, owing to the enzyme extraction, has been considered to be especially unsuitable as a raw material for the preparation of the pancreatic hormone.

The present invention is based on the surprising observation that one and the same pancreas can be used both for the preparation of the pancreatic hormone and for the production of enzyme preparations if the enzymes are extracted first and the residual material so obtained is subsequently used for the preparation of the pancreatic hormone. The invention thus depends on the new discovery that an extraction of the gland enzymes carried out in a suitable manner does not preclude the use of the extracted material for the preparation of the pancreatic hormone. Accordingly, the invention enables the quantity of raw material available to be utilised to better advantage, which is not only of great importance when limited quantities of the raw material are available, but is also an advantage when the raw material is available in ample quantities, since it is always an aim in the arts to utilise as completely as possible existing quantities of raw materials. Moreover, it appears to be possible by the invention to obtain pancreatic hormones having improved technical and therapeutic properties.

According to the process of the invention the enzymes are first extracted from the glands, and then the residual material so obtained is treated according to the known principles to recover the pancreatic hormone therefrom.

Before the enzyme extraction, the fresh glands or glands preserved, for instance by freezing, are pretreated in a usual manner, that is to say they are freed from any portions of fat and tissue attached thereto, and then cut into small pieces or brought into the form of a finely divided pulp, for instance by treatment in a meat mincing machine.

For the extraction of the gland enzymes there may be used any suitable agent which is not an active extracting agent for the hormone and has no destructive effect thereon under the extraction conditions used. Among the extraction conditions the temperature, the duration of the extraction, and the pH value prevailing during the extraction, are of decisive importance. The yield of hormone is dependent on all these three factors, while the yield of trypsin is dependent substantially only on the prevailing pH value and is thus independent of the temperature and the duration of the extraction, obviously within certain limits.

Thus, an increase in temperature and an increased duration of extraction lead to decreasing yields in the subsequent recovery of the hormone.

The extraction of the gland enzymes should therefore be carried out at a relatively low temperature i. e., a temperature below about 25° C., and be of quite short duration.

The pH value should in all cases be below 7, that is to say the extraction should be carried out in an acid medium. pH values as low as 1 or even lower may be used. However, it is of advantage to conduct the extraction under conditions which are not too acid. A suitable range of pH values is from 1 to 4.

It has been found that acidulated water is an excellent extracting agent, and, so far as can be seen, a pH value of approximately 2 during the extraction is the most suitable.

When using acidulated water as the extracting agent the extraction can be carried out very successfully at a pH value of approximately 2 and at about 0° C. for a period of about half an hour, but useful results are also obtained with longer extraction periods, for example, from 1-2 hours or longer. However, an extraction period of 24 hours is too long.

The following example illustrates the invention:

1 kilogram of pancreas is minced, and extracted at about 0 °C. for half an hour with 2 litres of water, to which 10 cc. of concentrated sulphuric acid have been added. The enzyme extract is separated, for example, by centrifuging or filtering, and the pancreatic hormone is recovered from the residue by extraction with acidified alcohol in the usual manner. A yield of trypsin of 10 million Fuld-Gross units and a yield of hormone of 2000 units are obtained.

These yields are to be regarded as average yields. With a particularly good gland material and the most suitable apparatus considerable higher yields both of the hormone and of the enzymes can be obtained.

Finally, it should be stated that when quite fresh glands are used, enzyme extracts may be obtained in which the enzymes, for example trypsin, are inactive. However, such extracts can be easily activated.

Having thus fully described my invention I claim as new and desire to secure by Letters Patent:

1. Method in recovering enzymes and insulin from pancreas glands of mammals which comprises treating the finely divided glands with an acid-reacting aqueous medium at a pH value above 1 and a temperature in the range of 0° C. to 25° C. for a period of time less than 24 hours, separating the liquid from the gland material recovering trypsin and other enzymes from the said liquid, and recovering insulin from the residual gland material.

2. Method in recovering enzymes and insulin from pancreas glands of mammals which comprises treating the finely divided glands with an acidified aqueous medium at a pH-valve below 1 and a temperature in the range of 0° C. to 25° C. for a period of time less than 24 hours thereby extracting trypsin and other enzymes without practically extracting the insulin, separating the liquid from the gland material, recovering the enzymes from the said liquid, treating the residual gland material with acidified alcohol to extract the insulin, separating the liquid from the residual gland material, and recovering the insulin from the said liquid.

3. Method in recovering enzymes and insulin from pancreas glands of mammals which comprises treating the finely divided glands with acidified water at a pH-value of 1-4 at a temperature near 0° C. thereby extracting trypsin and other enzymes without practically extracting the insulin, separating the liquid from the gland material, recovering trypsin and other enzymes from the said liquid, treating the residual gland material with acidified alcohol to extract the insulin, separating the liquid from the residual gland material, and recovering the insulin from the said liquid.

4. Method in recovering enzymes and insulin from pancreas glands of mammals, which comprises treating the finely divided glands with acidified water at a pH-value of about 2 at a temperature near 0° C. and for a period of time within the range of half an hour to two hours thereby extracting trypsin and other enzymes without practically extracting the insulin, separating the liquid from the gland material, recovering trypsin and other enzymes from the said liquid, treating the residual gland material with acidified alcohol to extract the insulin, separating the liquid from the residual gland material, and recovering the insulin from the said liquid.

SVEND EMIL FREDERIKSEN.

REFERENCES CITED

The following references are of record in the file of this patent:

UNITED STATES PATENTS

| Number | Name | Date |
|---|---|---|
| 412,836 | Carnich | Oct. 15, 1889 |
| 911,803 | Barr | Feb. 9, 1909 |
| 1,892,247 | Neugebauer | Dec. 27, 1932 |
| 1,959,750 | Wada | May 22, 1934 |

OTHER REFERENCES

C. A. 1930, p. 2544, by Kaulbersz.
C. A. 1925, p. 1176, by Scott et al.